United States Patent
Lan (10) Patent No.: US 12,147,350 B2
(45) Date of Patent: Nov. 19, 2024

(54) INTEGRATED CIRCUIT AND METHOD FOR CLEANING VALID BITS IN CACHE MEMORY OF THE INTEGRATED CIRCUIT

(71) Applicant: Nuvoton Technology Corporation, Hsinchu Science Park (TW)

(72) Inventor: Yung-Chi Lan, Taichung (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 47 days.

(21) Appl. No.: 18/319,708

(22) Filed: May 18, 2023

(65) Prior Publication Data

US 2024/0070085 A1     Feb. 29, 2024

(30) Foreign Application Priority Data

Aug. 30, 2022   (TW) .................................. 111132592

(51) Int. Cl.
*G06F 12/0895*   (2016.01)
*G06F 3/06*   (2006.01)
(Continued)

(52) U.S. Cl.
CPC ........ *G06F 12/0895* (2013.01); *G06F 3/0679* (2013.01); *G06F 12/0238* (2013.01);
(Continued)

(58) Field of Classification Search
None
See application file for complete search history.

(56) References Cited

U.S. PATENT DOCUMENTS

| | | | | |
|---|---|---|---|---|
| 6,226,715 B1 * | 5/2001 | Van Der Wolf | ...... | G06F 12/121 711/E12.07 |
| 7,475,321 B2 * | 1/2009 | Gurumurthi | ........ | G06F 11/0724 711/155 |

(Continued)

FOREIGN PATENT DOCUMENTS

| | | |
|---|---|---|
| TW | 201719420 A | 6/2017 |
| TW | 201729100 A | 8/2017 |
| TW | 201917735 A | 5/2019 |

OTHER PUBLICATIONS

Taiwanese Notice of Allowance issued on Aug. 30, 2023, for the corresponding application No. 111132592; pp. 1-7.

*Primary Examiner* — Christopher D Birkhimer
(74) *Attorney, Agent, or Firm* — MUNCY, GEISSLER, OLDS & LOWE, P.C.

(57) ABSTRACT

A method for cleaning valid bits in a cache memory is provided. The method includes performing a valid-bit-cleaning process to sequentially clean a valid bit corresponding to each address of the cache memory when an integrated circuit is booted up or enters a working state from a sleep mode. In response to a flash memory controller reading data from a specific address of the flash memory, the method includes notifying the cache memory controller to suspend the valid-bit-cleaning process, and utilizing the cache memory controller to write the data into the specific address of the cache memory and to set the valid bit corresponding to the specific address as valid. In response to the valid bit being set as valid, the method includes reading the data from the specific address of the cache memory, transmitting the data to the processor, and resuming the valid-bit-cleaning process.

10 Claims, 5 Drawing Sheets

(51) Int. Cl.
   *G06F 12/02*       (2006.01)
   *G06F 12/0868*     (2016.01)
   *G06F 12/0891*     (2016.01)
   *G06F 13/16*       (2006.01)

(52) U.S. Cl.
   CPC ...... *G06F 12/0868* (2013.01); *G06F 12/0891* (2013.01); *G06F 13/1668* (2013.01)

(56) References Cited

U.S. PATENT DOCUMENTS

| | | | | |
|---|---|---|---|---|
| 8,370,850 | B2* | 2/2013 | Nochimowski | G06F 3/0679 |
| | | | | 711/123 |
| 8,732,409 | B2* | 5/2014 | Van Der Wolf | G06F 12/0804 |
| | | | | 711/143 |
| 9,892,803 | B2* | 2/2018 | Reed | G06F 12/0811 |
| 10,891,228 | B2* | 1/2021 | Steinmacher-Burow | |
| | | | | G06F 12/0817 |
| 2001/0047454 | A1* | 11/2001 | Soderstrom | G06F 3/0632 |
| | | | | 711/118 |
| 2004/0039880 | A1* | 2/2004 | Pentkovski | G06F 12/0811 |
| | | | | 711/146 |
| 2006/0143406 | A1* | 6/2006 | Chrysos | G06F 12/0811 |
| | | | | 711/143 |
| 2006/0156155 | A1* | 7/2006 | Gurumurthi | G06F 11/0793 |
| | | | | 714/746 |
| 2010/0070711 | A1* | 3/2010 | Arimilli | G06F 12/0831 |
| | | | | 711/146 |
| 2010/0281216 | A1* | 11/2010 | Patel | G06F 12/121 |
| | | | | 711/E12.017 |
| 2011/0161784 | A1* | 6/2011 | Selinger | G06F 11/1016 |
| | | | | 714/E11.002 |
| 2014/0156909 | A1* | 6/2014 | Farhan | G06F 12/0871 |
| | | | | 711/103 |
| 2014/0237147 | A1* | 8/2014 | Joshi | G06F 3/0664 |
| | | | | 710/74 |
| 2014/0325148 | A1* | 10/2014 | Choi | G06F 3/0659 |
| | | | | 711/114 |
| 2014/0365719 | A1* | 12/2014 | Kuzmin | G06F 12/0246 |
| | | | | 711/103 |
| 2016/0246713 | A1* | 8/2016 | Choi | G06F 3/0608 |
| 2017/0300422 | A1* | 10/2017 | Szubbocsev | G06F 12/1009 |

* cited by examiner

FIG. 1

| 130 | VALID | TAG | DATA |
|---|---|---|---|
| 1 | V | TAG 1 | DATA 1 |
| 2 | NV | TAG 2 | DATA 2 |
| 3 | NV | TAG 3 | DATA 3 |
| 4 | V | TAG 4 | DATA 4 |
| ● | ● | ● | ● |
| ● | ● | ● | ● |
| ● | ● | ● | ● |

INTEGRATED CIRCUIT AND METHOD FOR CLEANING VALID BITS IN CACHE MEMORY OF THE INTEGRATED CIRCUIT

CROSS REFERENCE TO RELATED APPLICATIONS

This application claims priority of Taiwan Patent Application No. 111132592, filed on Aug. 30, 2022, the entirety of which is incorporated by reference herein.

BACKGROUND OF THE INVENTION

Field of the Invention

The disclosure is generally related to a memory control circuit, and more particularly it is related to an integrated circuit and a method for cleaning valid bits in a cache memory of the integrated circuit.

Description of the Related Art

In the design of hierarchical memory, when a certain circuit (such as a central processing unit (CPU) or another circuit) is going to access a certain memory, if the operating speed of the central processing unit and that of the accessed memory differ too much, a memory with a speed between that of the central processing unit and that of the accessed memory (low-speed) will be inserted. This memory is called cache memory. In addition to being used as a buffer, the cache memory also reads-in the data that is not currently being read. When the central processing unit just needs this data, the cache memory can quickly send the data back to the central processing unit without reading it from the low-speed memory.

However, each item of data read from the cache memory has a corresponding tag to note the address mapping relationship between the data and the accessed memory. When the central processing unit intends to access the data of the cache memory controller, the central processing unit first checks whether the data has a corresponding tag in the cache memory. When the corresponding tag exists and its valid bit is valid, the cache memory sends the data directly to the central processing unit. Cache memory is usually implemented with static random access memory (SRAM).

In low-power system design, when the system enters a sleep mode or power-saving mode, the static random access memory will be powered off as much as possible as a means of reducing power consumption. Of course, these powered-off SRAMs also include cache memory. However, when the system is just turned on or wakes up after entering sleep mode, the SRAM is woken up from a power-off state. Depending on the duration of the sleep mode and the environment in which the system is operating, the static random access memory that is utilized as a valid bit may still have some undischarged charge, leading to the contents of the cache memory being in a pseudo-valid state.

However, the traditional mechanism for cleaning valid bits of cache memory often takes a lot of time, which leads to a longer start-up time or wake-up time for the entire system, thereby resulting in a loss of power consumption of the system.

BRIEF SUMMARY OF THE INVENTION

For solving the above problems, the invention provides an integrated circuit and a method for cleaning valid bits in a cache memory of the integrated circuit.

In an embodiment, an integrated circuit comprises a processor, a cache memory, a cache memory controller, a flash memory, and a flash memory controller. The cache memory comprises a plurality of addresses, wherein each of the addresses comprises a valid bit, a tag, and a data column. The cache memory controller is configured to control access to the cache memory. The flash memory controller is configured to control access to the flash memory. When the integrated circuit is booted up or enters a working state from a sleep mode, the cache memory controller performs a valid-bit-cleaning process to sequentially clean the valid bit corresponding to each of the addresses in the cache memory. In response to the flash memory controller reading data corresponding to a specific address from the flash memory, the flash memory controller notifies the cache memory controller to suspend the valid-bit-cleaning process, and the cache memory controller then writes the data into the specific address of the cache memory, writes a mapping address corresponding to the specific address into the tag corresponding to the specific address of the cache memory, and sets the valid bit corresponding to the specific address as valid. In response to the valid bit corresponding to the specific address of the cache memory being set as valid, the cache memory controller reads the data from the specific address of the cache memory and transmits the data to the processor, and resumes the valid-bit-cleaning process.

According to an embodiment of the invention, when the cache memory controller writes the data into the specific address in the cache memory, the cache memory controller writes the specific address and the mapping address corresponding to the specific address into a register.

According to an embodiment of the invention, when the valid-bit-cleaning process is performed on the specific address, the cache memory controller skips the valid-bit-cleaning process on the specific address in the cache memory according to the specific address stored in the register.

According to an embodiment of the invention, when the valid-bit-cleaning process is performed on the specific address, the register is configured to store a second specific address and a second mapping address corresponding to the second specific address, wherein the second specific address is greater than the specific address.

According to an embodiment of the invention, when the integrated circuit is booted up or enters the working state from the sleep mode, the processor transmits a data-read command to the flash memory controller so as to read the data from the specific address of the flash memory.

In an embodiment, a method for cleaning valid bits in a cache memory is provided, which is adapted to an integrated circuit. The integrated circuit comprises a processor, a cache memory, a cache memory controller, a flash memory, and a flash memory controller. The cache memory comprises a plurality of addresses, and the content of each of the addresses comprises a valid bit, a tag, and a data column. The method comprises the following steps. When the integrated circuit is booted up or enters a working state from a sleep mode, the flash memory controller is utilized to perform a valid-bit-cleaning process to sequentially clean the valid bit corresponding to each of the addresses in the cache memory. In response to the flash memory controller reading data from a specific address of the flash memory, the flash memory controller is utilized to notify the cache memory controller to suspend the valid-bit-cleaning process, and the cache memory controller is utilized to write the data into the specific address of the cache memory, to write a mapping address corresponding to the specific address into the tag corresponding to the specific address in the cache memory, and to set the valid bit corresponding to the specific address as valid. In response to the valid bit corresponding to the specific address in the cache memory being set as valid, the cache memory controller is utilized to read the data from the specific address of the cache memory, to transmit the data to the processor, and to resume the valid-bit-cleaning process.

According to an embodiment of the invention, the method for cleaning valid bits in the cache memory further comprises the following step. When the cache memory controller writes the data into the specific address in the cache memory, the cache memory controller is utilized to write the specific address and the mapping address corresponding to the specific address into a register.

According to an embodiment of the invention, the method for cleaning valid bits in the cache memory further comprises the following step. When the valid-bit-cleaning process is performed on the specific address, the cache memory controller is utilized to skip a valid-bit-cleaning process on the specific address of the cache memory according to the specific address stored in the register.

According to an embodiment of the invention, when the valid-bit-cleaning process is performed on the specific address, the register is configured to store a second specific address and a second mapping address corresponding to the second specific address. The second specific address is greater than the specific address.

According to an embodiment of the invention, the method for cleaning valid bits in the cache memory further comprises the following step. When the integrated circuit is booted up or enters the working state from the sleep mode, utilizing the processor to transmit a data-read command to the flash memory controller so as to read the data from the specific address of the flash memory.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the disclosure and should not be taken in a limiting sense. The scope of the disclosure is determined by reference to the appended claims.

In the following detailed description, for purposes of explanation, numerous specific details and embodiments are set forth in order to provide a thorough understanding of the present disclosure. The use of like and/or corresponding numerals in the drawings of different embodiments does not suggest any correlation between different embodiments.

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section in the specification could be termed a second element, component, region, layer, portion or section in the claims without departing from the teachings of the present disclosure.

In addition, in this specification, relative spatial expressions are used. For example, "lower", "bottom", "higher" or "top" are used to describe the position of one element relative to another. It should be appreciated that if a device is flipped upside down, an element that is "lower" will become an element that is "higher".

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

The terms "approximately", "about" and "substantially" typically mean a value is within a range of +/−20% of the stated value, more typically a range of +/−10%, +/−5%, +/−3%, +/−2%, +/−1% or +/−0.5% of the stated value. The stated value of the present disclosure is an approximate value. Even there is no specific description, the stated value still includes the meaning of "approximately", "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

Figure 1:
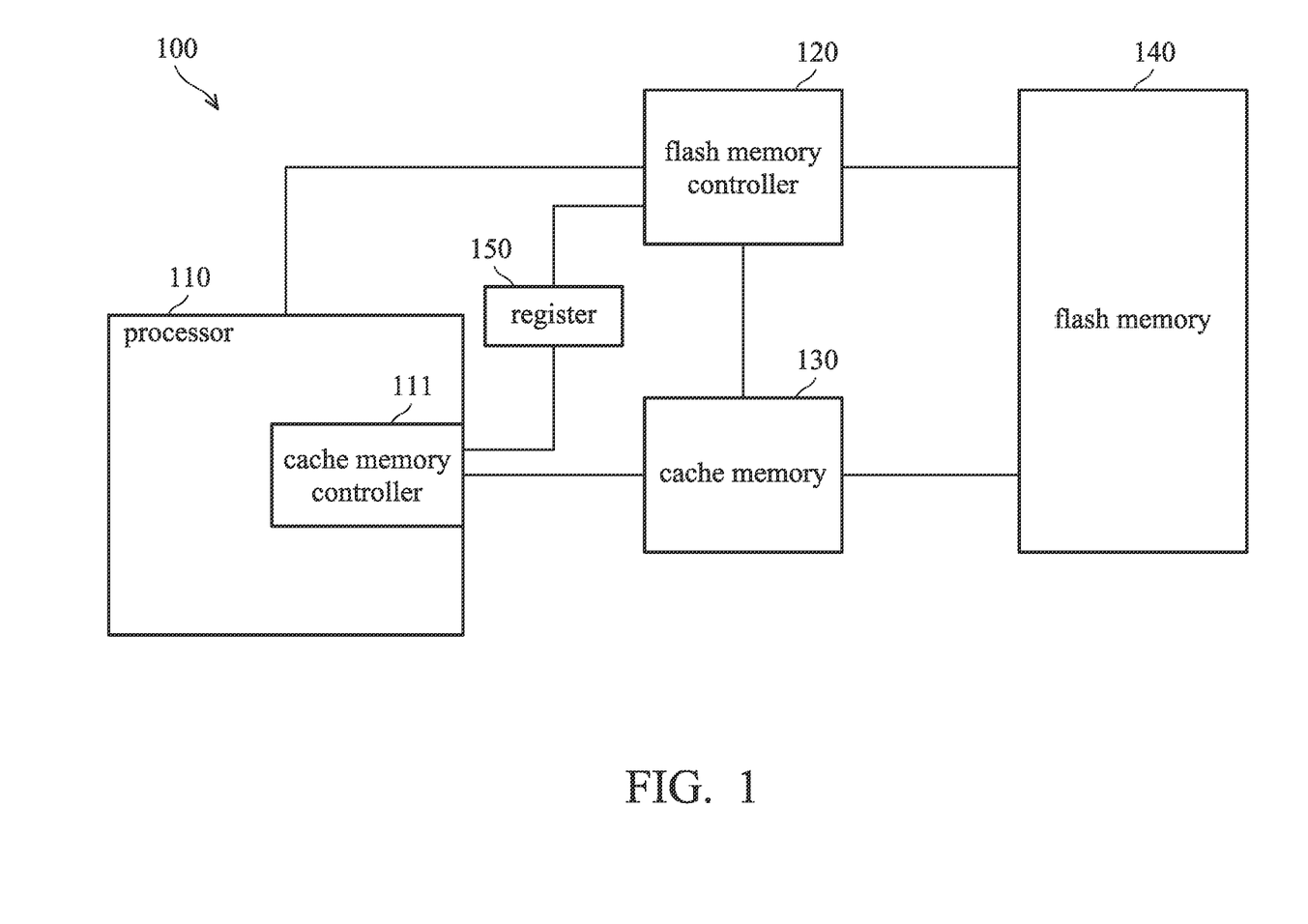
FIG. 1 is a block diagram of an integrated circuit in accordance with an embodiment of the present invention.

FIG. 1 is a block diagram of an integrated circuit in accordance with an embodiment of the present invention.

The integrated circuit 100 may be, for example, a system on chip (SoC) or an application-specific integrated circuit (ASIC). As shown in FIG. 1, the integrated circuit 100 includes a processor 110, a flash memory controller 120, a cache memory 130, a flash memory 140, and a register 150. The processor 110 may be, for example, a central processing unit (CPU), a microcontroller (MCU), a digital signal processor (DSP), etc., but the invention is not limited thereto. The cache memory 130 may be implemented by static random access memory (SRAM), for example, but the invention is not limited thereto.

In some embodiments, the processor 110 includes a cache memory controller 111 for controlling operations such as data access and cleaning valid bits of the cache memory. In some other embodiments, the cache memory controller 111 may be disposed outside the processor 110, but the present invention is not limited thereto.

The flash memory controller 120 is electrically connected to the processor 110, the cache memory 130, the flash memory 140, and the register 150. The flash memory controller 120 is configured to control the data access of the flash memory 140, and may write the data read from the flash memory 140 to the cache memory 130 and/or the register 150. In addition, both the cache memory controller 111 and the flash memory controller 120 may control the data access of the register 150.

Figure 2:
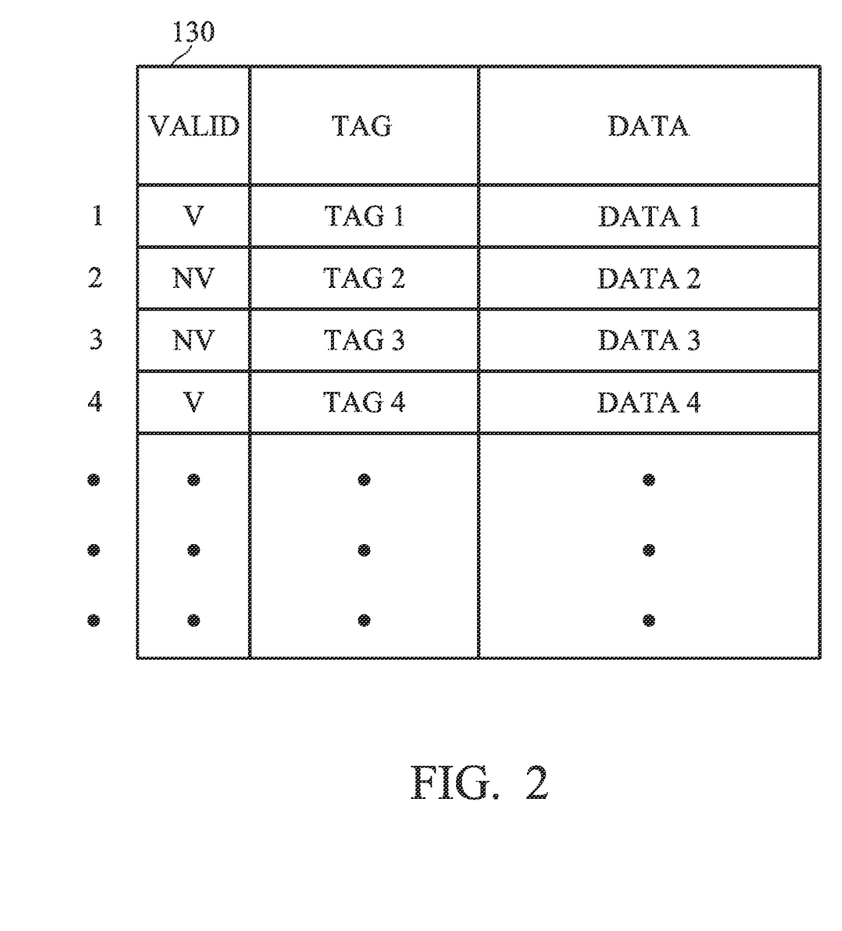
FIG. 2 is a schematic diagram of a data structure of a cache memory in accordance with an embodiment of the present invention.

FIG. 2 is a schematic diagram of a data structure of a cache memory in accordance with an embodiment of the present invention. Please refer to FIG. 1 and FIG. 2 at the same time.

As shown in FIG. 2, the cache memory 130 includes a plurality of indexes, such as from index 1 to index N, where the contents stored in each index include a valid bit column (VALID), a tag column (TAG) and a data column (DATA). When the content of a specific index of the cache memory 130 is updated by the access request from the processor 110, the valid bit of the specific index will be marked as valid, as shown by the marked V in the valid bit column VALID of FIG. 2. When the content of the specific index of the cache memory 130 has not been updated, the valid bit of the specific index will be marked as invalid, as shown by the marked NV in the valid bit column VALID of FIG. 2.

In the embodiment of FIG. 2, the valid bits at index 1 and index 4 are marked as valid (V), so the corresponding tags TAG1 and TAG4 and data DATA1 and DATA4 are valid. Valid bits at index 2 and index 3 are marked as invalid (NV), so the corresponding tags TAG2 and TAG2, and data DATA2 and DATA3 are invalid, and so on.

In detail, when the system is just turned on or enters sleep mode and then wakes up again, the cache memory 130 wakes up from a power-off state, so the tag column TAG of each index in the cache memory 130 and the contents of the data column DATA at this time are most likely incorrect. Therefore, the valid bit column VALID of each index in the cache memory 130 needs to be cleaned and marked as invalid (NV) first, so as not to allow the processor 110 to read wrong data from the cache memory 130. The processor 110 will not start subsequent access operations until the valid bit column VALID of each index in the cache memory 130 is marked as invalid (NV). Then, when the processor 110 wants to read the data of a specific index in the cache memory 130, the valid bit of the specific index needs to be set as valid (V) first. The present invention provides two different methods for cleaning valid bits of a cache memory in the embodiments shown in FIG. 3 and FIG. 4.

Figure 3:
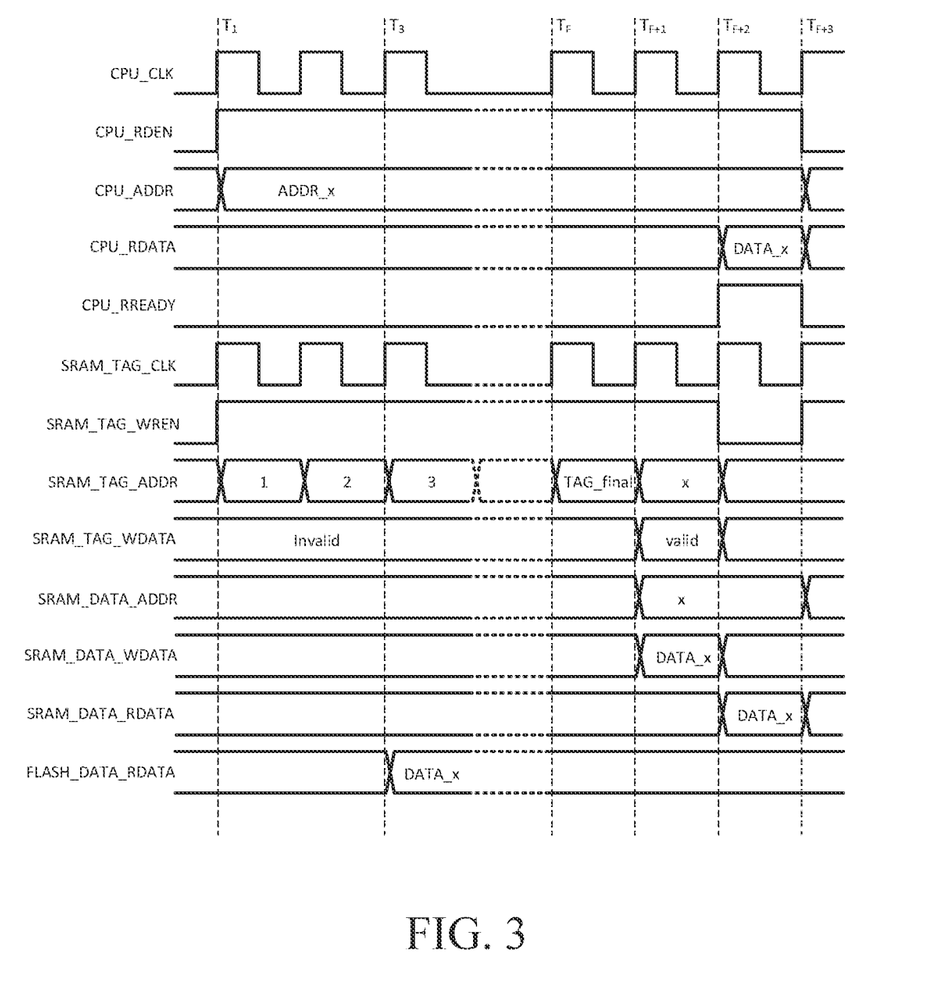
FIG. 3 is a waveform diagram of a processor accessing a flash memory in accordance with an embodiment of the present invention.

FIG. 3 is a waveform diagram of a processor accessing a flash memory in accordance with an embodiment of the present invention. Please refer to FIG. 1 and FIG. 3 at the same time.

In the embodiment shown in FIG. 3, the definition of various signals should be described first. The signals related to the processor 110 include: CPU_CLK indicates the processor clock signal; CPU_RDEN indicates the processor read enable signal; CPU_ADDR indicates the processor address signal; CPU_RDATA indicates the processor read data signal; CPU_RREADY indicates the processor read ready signal.

Signals related to the cache memory 130 include: SRAM_TAG_CLK indicates a cache memory tag clock signal; SRAM_TAG_WREN indicates a cache memory tag write enable signal; SRAM_TAG_ADDR indicates a cache memory tag address signal; SRAM_TAG_WDATA indicates a cache memory tag write data signal; SRAM_DATA_ADDR indicates a cache memory data address signal; SRAM_DATA_WDATA indicates a cache memory write data signal; SRAM_DATA_RDATA indicates a cache memory read data signal.

The signals related to the flash memory 140 include: FLASH_DATA_RDATA indicates a flash memory read data signal.

As shown in FIG. 3, at time $T_1$, the processor 110 sends a read request of the address ADDR_x. In this embodiment, since the system has just been turned on or has just been woken up from a sleep mode, the cache memory controller 111 performs the first valid-bit-cleaning process to clean the valid bit of each index in the cache memory 130 one by one to be an invalid state. It should be noted that when the cache memory controller 111 performs the first valid-bit-cleaning process, the cache memory controller 111 may set the busy flag of the cache memory 130 to 1, so as to prevent the processor 110 or the flash memory controller 120 from accessing the cache memory 130.

However, compared to the processor clock signal CPU_CLK and the cache memory tag clock signal SRAM_TAG_CLK (e.g., 100 MHz or above), the read speed of the flash memory 140 is relatively slow (e.g., 25 MHz), so the flash memory 140 cannot prepare the data to be read by the processor 110 at time $T_2$ (i.e., the next clock cycle).

For the convenience of explanation, it is assumed in this embodiment that the flash memory 140 has finished reading the data DATA_x required by the processor 110's read request at time $T_3$ (note: in fact, the read is usually completed after time $T_3$). At this time, although the flash memory 140 has prepared the data DATA_x at time $T_3$, since the cache memory controller 111 is still executing the first valid-bit-cleaning process to clean each index in the cache memory 130 one by one, the flash memory controller 120 still cannot write the data DATA_x to the cache memory 130 through the cache memory controller 111. After the first valid-bit-cleaning process is completed, the cache memory controller 111 may set the busy flag of the cache memory 130 to 0 to notify the processor 110 and the flash memory controller 120 that the data of the cache memory 130 can be accessed.

For example, at time $T_F$, the cache memory controller 111 is ready to clean the last valid bit VALID_final, and at time $T_{F+1}$, the cache memory controller 111 has cleaned all valid bits in the cache memory 130. At this time, the flash memory controller 120 can write the read data DATA_x into the data column DATA of the index x of the cache memory 130 through the cache memory controller 111, and write the mapping address corresponding to the index x to the tag column TAG and the valid bit VALID to be valid (V).

Next, at time $T_{F+2}$, since there is already valid data stored in the address ADDR_x of the cache memory 130, the cache memory controller 111 transmits the data DATA_x stored in the index x of the cache memory 130 to the processor 110, and the processor read ready signal CPU_RREADY is pulled to a high logic state to indicate that the read operation is completed. Therefore, at time $T_{F+3}$, the cache memory controller 111 can accept a new read request again.

Figure 4:
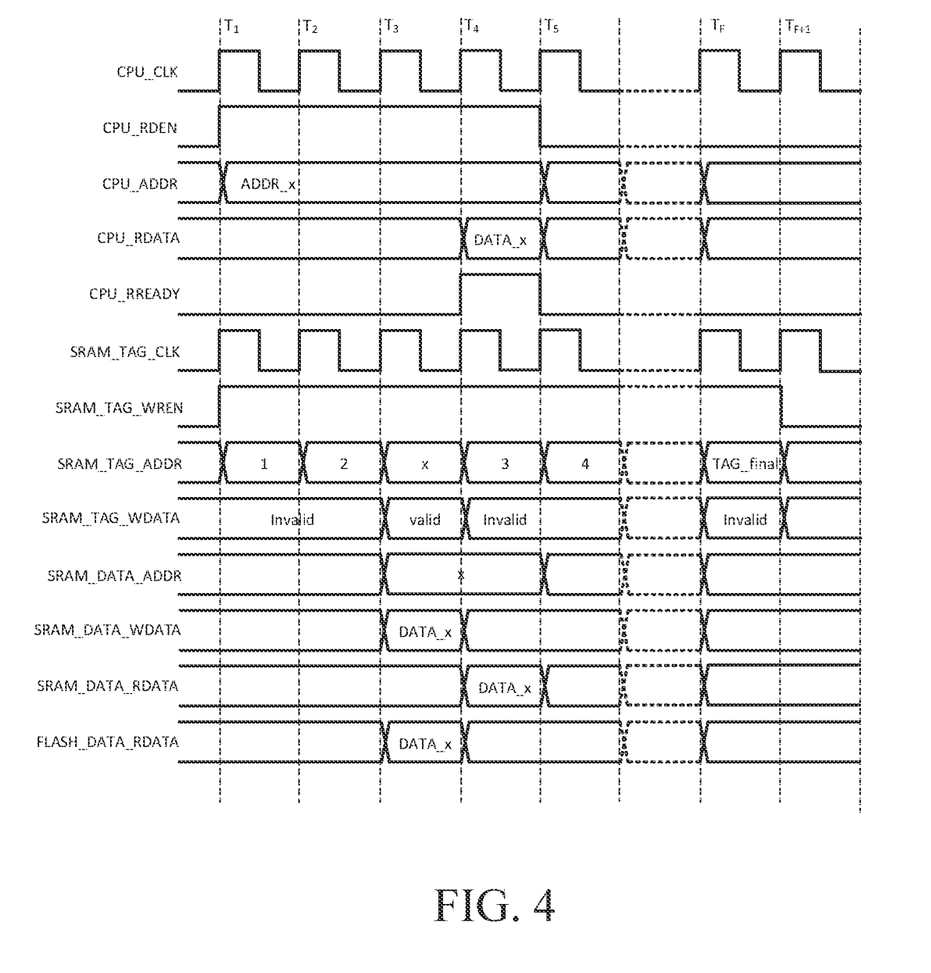
FIG. 4 is a waveform diagram of a processor accessing a flash memory in accordance with another embodiment of the present invention.

FIG. 4 is a waveform diagram of a processor accessing a flash memory in accordance with another embodiment of the present invention. Please refer to FIG. 1 and FIG. 4 at the same time.

The various signals shown in FIG. 4 are similar to those in FIG. 3, so the content thereof is not be repeated herein. As shown in FIG. 4, at time $T_1$, the processor 110 issues a read request for the address ADDR_x. In this embodiment, since the system has just been turned on or has just been woken up from the sleep mode, the cache memory controller 111 performs a second valid-bit-cleaning process to clean the valid bit of each index in the cache memory 130 one by one to be an invalid state. It should be noted that when the cache memory controller 111 performs the second valid-bit-cleaning process, the cache memory controller 111 can also set the busy flag of the cache memory 130 to 1 to prevent the processor 110 or the flash memory controller 120 from accessing the cache memory 130.

However, compared the processor clock signal CPU_CLK with the cache memory tag clock signal SRAM_TAG_CLK (e.g., 100 MHz or above), the read speed of the flash memory 140 is relatively slow (e.g., 25 MHz), so the flash memory 140 cannot prepare the data to be read by the processor 110 at time $T_2$ (i.e., the next clock cycle).

For convenience of explanation, it is assumed in this embodiment that the flash memory 140 has finished reading the data DATA_x required by the read request of the processor 110 at time $T_3$ (note: in fact, the read is usually completed after time $T_3$). At this time, the flash memory 140 has prepared the data DATA_x at time $T_3$, and notifies the cache memory controller 111 to suspend the second valid-bit-cleaning process, for example, pausing at the cache memory tag address signal SRAM_TAG_ADDR=2. The cache memory controller 111 directly sets the valid bits of the corresponding address (note: corresponding to the cache memory tag address signal) in the cache memory 130 as valid, and directly writes the data DATA_x to the data column DATA of the corresponding address of the cache memory 130. It should be noted that the corresponding addresses above are determined by different cache memory architectures. For example, when the cache memory is a direct-mapping architecture, the corresponding address is the remainder obtained from ADDR_x divided by the number of cache memory blocks, but the present invention is not limited thereto.

Then, at time $T_4$, the cache memory controller 111 resumes the second valid-bit-cleaning process from the cache memory tag address signal SRAM_TAG_ADDR=3. In addition, at time $T_4$, the cache memory controller 111 can transmit the data DATA_x of the corresponding address in the cache memory 130 to the processor 110, and pull the processor read ready signal CPU_RREADY to a high logic state to indicate that the read operation is completed.

It should be noted that at time $T_3$, when the flash memory controller 120 directly writes the data DATA_x into the data column DATA of the index x in the cache memory 130 through the cache memory controller 111, the flash memory controller 120 writes the address of the index x into the register 150. For example, the second valid-bit-cleaning process also cleans the valid bit of each index in the cache memory 130 one by one to be an invalid state. Assuming that index x=5, when the second valid-bit-cleaning process cleans the valid bit of each index one by one until the index x=5, since the register 150 has stored the index x=5, it indicates that the index x=5 has been accessed when the second valid bit process is performed. That is, the content value of the index x=5 (including valid bit, tag, and data) is valid. Therefore, the second valid-bit-cleaning process skips the valid-bit-cleaning operation at index x=5, and continues to clean valid bits from index x=6.

It should be noted that since the read speed of the flash memory 140 is much slower than the access speed of the cache memory 130, a small amount of registers 150 is sufficient for the cache memory controller 111 to perform the second valid-bit-cleaning process in generally speaking. When the access speed of the cache memory 130 is significantly different from the read speed of the flash memory 140 (4 times faster or more), the number of registers 150 can be reduced accordingly. When the difference between the access speed of the cache memory 130 and the read speed of the flash memory 140 is small (less than 4 times), the number of registers 150 can be increased accordingly.

More specifically, in the embodiment of FIG. 4, the cache memory controller 111 can perform the second valid-bit-cleaning process to clean valid bits of each index in the cache memory 130 while the flash memory controller 120 is reading data from the flash memory 140. When the second valid-bit-cleaning process has been performed to the position of the index x, the content value of the register 150 can be configured to determine whether the valid bit of the index x needs to be cleaned or whether the valid bit of the index x needs is valid. For example, when the second valid-bit-cleaning process is performed to the position of the index x, the processor 110 issues a read request of the address ADDR_y (corresponding to the index y), and the index y>index x. Then, the content of the index y is updated and the index y is written into the register 150. When index x>index y, it is directly determined to whether the tag TAG corresponding to the index y hits.

Compared to the embodiment in FIG. 3, the embodiment in FIG. 4 can more effectively pre-write the data read from the flash memory 140 to the cache memory 130 without waiting for the valid-bit-cleaning process performed by the cache memory completely performed, and the cache memory controller 111 can immediately transmit the data pre-written in the cache memory 130 to the processor 110 in the next clock cycle, so as to reduce the waiting time for the integrated circuit 100 starting up or entering the working state from the sleep mode. Therefore, the power consumption of the integrated circuit 100 can be reduced.

Figure 5:
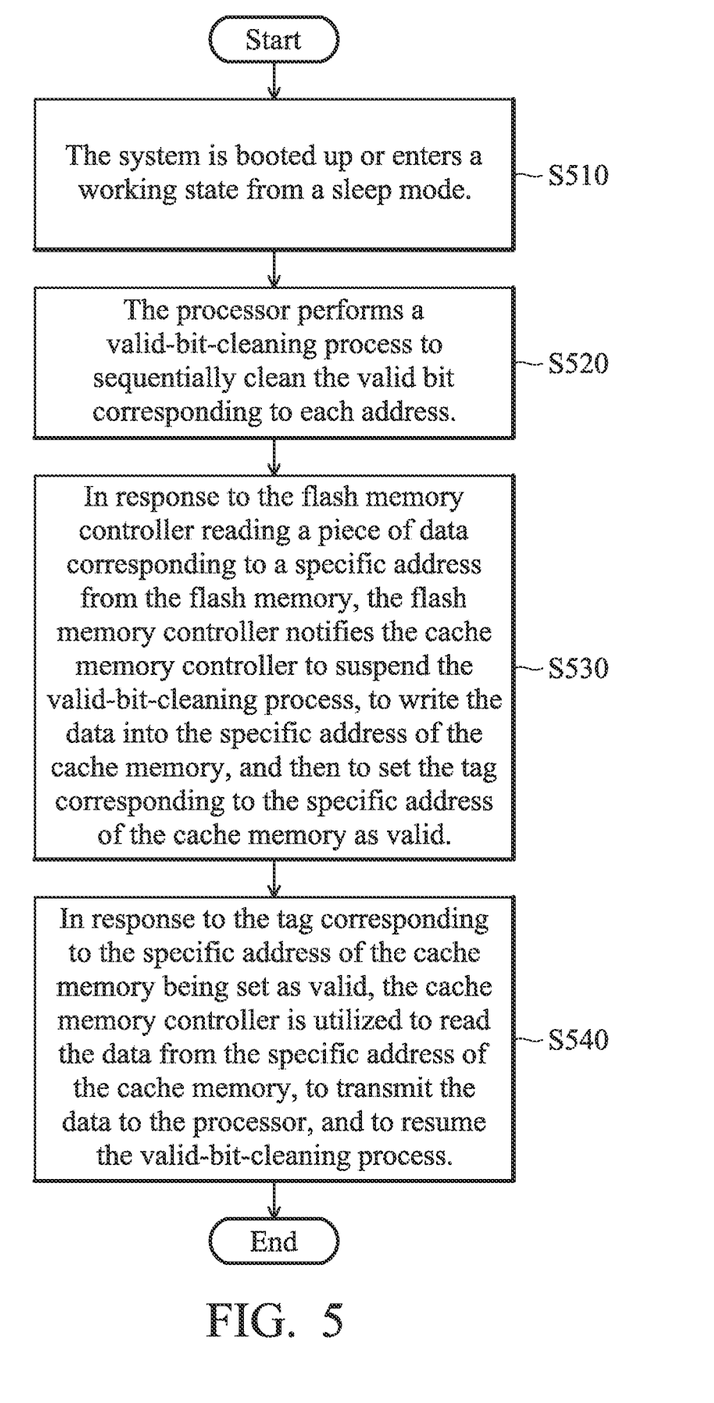
FIG. 5 is a flowchart of a method for cleaning valid bits of a cache memory in accordance with an embodiment of the present invention.

FIG. 5 is a flowchart of a method for cleaning valid bits of a cache memory in accordance with an embodiment of the present invention. Please refer to FIG. 1, FIG. 4, and FIG. 5 at the same time.

In step S510, the system is turned on or enters a working state from a sleep mode. For example, when the system (such as including the integrated circuit 100 and various connected components) enters the sleep mode or the power saving mode, the SRAM (including the cache memory) will be powered off as much as possible to as a means of reducing power consumption. Of course, these powered-off SRAMs also include cache memory. However, when the system is just turned on or wakes up from sleep mode, SRAM (including cache memory) is woken up from a power-off state. Depending on the duration of the sleep mode and the environment where the system operates, the static random access memory for valid bits may still have some undischarged charge so that the static random access memory for valid bits may still store a random value after waking up, which causes the cache memory controller 111 to misjudge it as valid.

In step S520, the cache memory controller 111 performs a valid-bit-cleaning process (such as the second valid-bit-cleaning process in the embodiment of FIG. 4) to sequentially clean the valid bit corresponding to each address. For example, when the cache memory controller 111 performs the second valid-bit-cleaning process, the cache memory controller 111 can also set the busy flag of the cache memory 130 to 1, so as to prevent the processor 110 or the flash memory controller 120 from accessing the cache memory 130.

In step S530, in response to the flash memory controller 120 reading a piece of data corresponding to a specific address from the flash memory 140, the flash memory controller 120 notifies the cache memory controller 111 to suspend the valid-bit-cleaning process, writes the data into the specific address of the cache memory 130, and then sets the tag corresponding to the specific address of the cache memory 130 as valid. In one embodiment, for example, it is assumed that the valid-bit-cleaning process has been currently performed on index x and the access request issued by processor 110 intends to access index y. When index y is greater than index x, the flash memory controller 120 directly writes the data DATA_x into the data column of the index y in the cache memory 130 through the cache memory controller 111 and writes the index y into the register 150, and the cache memory controller 111 then responds to the access request of the processor 110. That is, the register 150 can be used for later indexing operations to determine whether the index y has been written data to the cache memory during the valid-bit-cleaning process, and the cache memory controller 111 can performs the valid-bit-cleaning process (for example, the second valid-bit-cleaning process in the embodiment of FIG. 4) to clean the valid bit of each index in the cache memory 130 while the flash memory controller 120 accesses data from the flash memory 140. When the processor 110 intends to access the data of index y again during the valid-bit-cleaning process, the cache memory controller 111 directly responds to the access request of the processor 110. When the index y is less than or equal to the index x, the flash memory controller 120 directly writes the data DATA_x into the data column DATA of the index x in the cache memory 130 through the cache memory controller 111 and writes the tag column of index x as valid (V), and the cache controller 111 then responds to access request of the processor 110.

In step S540, the cache memory controller 111 reads the data from the specific address of the cache memory 130, transmits the data to the processor 110, and resumes the valid-bit-cleaning process. For example, the flash memory controller 120 can pre-write the data read from the flash memory 140 into the cache memory 130 through the cache memory controller 111 without waiting for the valid bits cleaning process performed by the cache memory controller 111 being completely performed, and the cache memory controller 111 can transmit the data pre-written into the cache memory 130 to the processor 110 immediately in the next clock cycle, so as to reduce the time spent on the integrated circuit 100 waiting for the system starting up or entering the working state from the sleep mode, thereby reducing the power consumption of the integrated circuit 100.

In summary, the present invention provides an integrated circuit and a method for cleaning valid bits of a cache memory of the integrated circuit. When the cache memory controller performs the valid-bit-cleaning process of the cache memory and the flash memory controller has finished reading the data from the specific address of the flash memory, the flash memory controller can notify the cache memory controller to suspend the valid-bit-cleaning process, and the cache memory controller pre-writes the data into the cache memory. The cache memory controller can transmit the data pre-written in the cache memory to the processor right in the next clock cycle so as to reduce the time for the integrated circuit waiting for the system starting up or entering the working state from the sleep mode, thereby reducing the power consumption of the integrated circuit.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An integrated circuit, comprising:
a processor;
a cache memory, comprising a plurality of addresses, wherein each of the addresses comprises a valid bit, a tag, and a data column;
a cache memory controller, configured to control access to the cache memory;
a flash memory; and
a flash memory controller, configured to control access to the flash memory;
wherein when the integrated circuit is booted up or enters a working state from a sleep mode, the cache memory controller performs a valid-bit-cleaning process to sequentially clean the valid bit corresponding to each of the addresses in the cache memory;
wherein in response to the flash memory controller reading data corresponding to a specific address from the flash memory, the flash memory controller notifies the cache memory controller to suspend the valid-bit-cleaning process, and the cache memory controller then writes the data into the specific address of the cache memory, writes a mapping address corresponding to the specific address into the tag corresponding to the specific address of the cache memory, and sets the valid bit corresponding to the specific address as valid;
wherein in response to the valid bit corresponding to the specific address of the cache memory being set as valid, the cache memory controller reads the data from the specific address of the cache memory and transmits the data to the processor, and resumes the valid-bit-cleaning process.

2. The integrated circuit as defined in claim 1, wherein when the cache memory controller writes the data into the specific address in the cache memory, the cache memory controller writes the specific address and the mapping address corresponding to the specific address into a register.

3. The integrated circuit as defined in claim 2, wherein when the valid-bit-cleaning process is performed on the specific address, the cache memory controller skips the valid-bit-cleaning process on the specific address in the cache memory according to the specific address stored in the register.

4. The integrated circuit as defined in claim 2, wherein when the valid-bit-cleaning process is performed on the specific address, the register is configured to store a second specific address and a second mapping address corresponding to the second specific address, wherein the second specific address is greater than the specific address.

5. The integrated circuit as defined in claim 1, wherein when the integrated circuit is booted up or enters the working state from the sleep mode, the processor transmits a data-read command to the flash memory controller so as to read the data from the specific address of the flash memory.

6. A method for cleaning valid bits in a cache memory, adapted to an integrated circuit, wherein the integrated circuit comprises a processor, a cache memory, a cache memory controller, a flash memory, and a flash memory controller, wherein the cache memory comprises a plurality of addresses, and content of each of the addresses comprises a valid bit, a tag, and a data column, wherein the method comprises the following steps:

when the integrated circuit is booted up or enters a working state from a sleep mode, utilizing the flash memory controller to perform a valid-bit-cleaning process to sequentially clean the valid bit corresponding to each of the addresses in the cache memory;

in response to the flash memory controller reading data from a specific address of the flash memory, utilizing the flash memory controller to notify the cache memory controller to suspend the valid-bit-cleaning process, and utilizing the cache memory controller to write the data into the specific address of the cache memory, to write a mapping address corresponding to the specific address into the tag corresponding to the specific address in the cache memory, and to set the valid bit corresponding to the specific address as valid; and in response to the valid bit corresponding to the specific address in the cache memory being set as valid, utilizing the cache memory controller to read the data from the specific address of the cache memory, to transmit the data to the processor, and to resume the valid-bit-cleaning process.

7. The method for cleaning valid bits in the cache memory as defined in claim 6, further comprising:

when the cache memory controller writes the data into the specific address in the cache memory, utilizing the cache memory controller to write the specific address and the mapping address corresponding to the specific address into a register.

8. The method for cleaning valid bits in the cache memory as defined in claim 7, further comprising:

when the valid-bit-cleaning process is performed on the specific address, utilizing the cache memory controller to skip a valid-bit-cleaning process on the specific address of the cache memory according to the specific address stored in the register.

9. The method for cleaning valid bits in the cache memory as defined in claim 8, wherein when the valid-bit-cleaning process is performed on the specific address, the register is configured to store a second specific address and a second mapping address corresponding to the second specific address, wherein the second specific address is greater than the specific address.

10. The method for cleaning valid bits in the cache memory as defined in claim 6, further comprising:

when the integrated circuit is booted up or enters the working state from the sleep mode, utilizing the processor to transmit a data-read command to the flash memory controller so as to read the data from the specific address of the flash memory.

* * * * *